April 14, 1931.  H. S. BANFIELD  1,800,813
OUTLET BOX FOR ELECTRIC WIRES
Filed Nov. 28, 1925
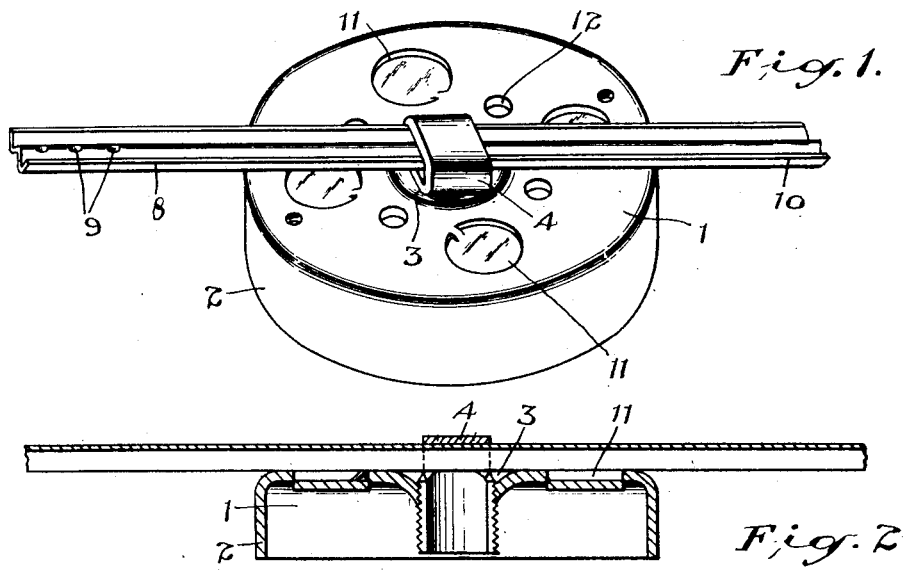
Fig. 1.
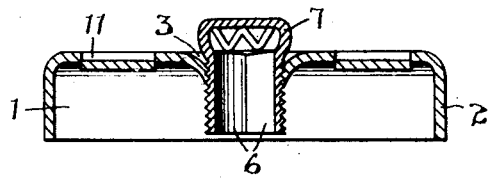
Fig. 2.
Fig. 3.
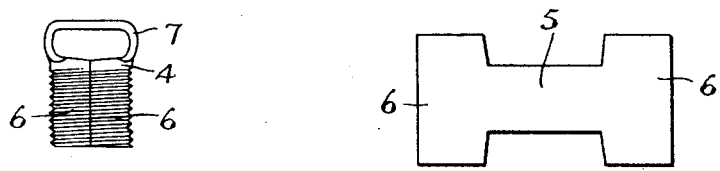
Fig. 5.  Fig. 4.
Inventor.
Harry S. Banfield
by H. J. S. Dennison
atty.

Patented Apr. 14, 1931

1,800,813

UNITED STATES PATENT OFFICE

HARRY SOMMERVILLE BANFIELD, OF TORONTO, ONTARIO, CANADA, ASSIGNOR, BY MESNE ASSIGNMENTS, TO ROACH-APPLETON MANUFACTURING COMPANY, OF CHICAGO, ILLINOIS, A CORPORATION OF ILLINOIS

OUTLET BOX FOR ELECTRIC WIRES

Application filed November 28, 1925, Serial No. 72,053, and in Canada July 28, 1925.

The principal objects of the invention are, to reduce the cost of manufacture and simplify the construction and to provide a fixture which may be very readily adjusted and may be rigidly secured in adjustable positions without the use of tools.

The principal feature of the invention consists in forming a sheet metal member into a nipple and fastening loop to slidably engage a supporting bar and form a box with an indented threaded centre to receive the nipple, the box binding against the supporting bar.

In the drawings, Figure 1 is a perspective view showing the back of my improved box and supporting bar.

Figure 2 is a longitudinal section through the box and bar showing the securing nipple.

Figure 3 is a cross section through the box and bar taken at right angles to the view shown in Figure 2.

Figure 4 is a plan view of the blank from which the securing nipple is made.

Figure 5 is an elevational view of the securing nipple.

Metal outlet boxes in the form of flat cups supported upon metal rods for ceiling and wall outlets, have been in use prior to this invention but such boxes and particularly the adjustable means of securing the boxes to the supporting bar have been cumbersome and fairly expensive to produce.

In the present invention the box 1 consists of a sheet metal member formed into a flat cupped shape having a circular edge flange 2 and a central depression 3 which is threaded to receive the holding nipple, the threaded wall being formed at the inward part of the depression with the walls sloping outwardly toward the top thereof.

The nipple 4 is preferably formed from a strip 5 of sheet metal having T headed ends 6. These end portions are bent into half cylindrical formation and the central strip 5 is bent into a loop 7 so that the semi-cylindrical ends are brought together and form a cylindrical member, the outer periphery of which is suitably threaded to mesh with the threaded walls of the depression 3.

The loop 7 may be formed of any desirable shape in order to receive the supporting bar 8 and said bar may be of any suitable cross section, though the preferable form is here shown of a strip of thin sheet metal bent longitudinally into a form of double ribbed flat bar. This double ribbed form of bar, which in cross section is of a W shape forms a very rigid support for the box and is made of very light metal.

Suitable holes 9 are punched through the apexes of the ribs 10 to enable the ready insertion of nails or fastening screws.

The box 1 is formed with the usual partly punched out openings 11 and the holes 12.

In the use of this box the nipple is assembled into the threaded depression 3, the looped portion extending above the back and the bar 8 is slipped therethrough. The bar is then held securely while the box is turned until its back face rubs tightly against the under edges of the bar.

This arrangement holds the box securely in any desired position of adjustment in the length of the bar. The bar is placed in position between the joists or studs of a building and fastening nails are inserted through the holes punched in the ends thereof.

The box as is well understood is of the ordinary depth of plaster coating and it may be adjusted on the bar by simply turning it to loosen up on the threaded nipple and then sliding the nipple on the bar and it is again fastened by a slight turn.

The tapering depression 3 in the box leading to the threaded orifice allows the looped end 7 of the nipple to extend into same so that the bottom of the transverse slot formed in the nipple will, when the nipple is tightened, move below the level of the back of the box and allow the longitudinally ribbed bar 8 to bear against the box, thus clamping the bar securely. The bar 8 being ribbed as described may be made of very light metal but will be very rigid and when it is secured at the ends to the joists or studs of a building, the box may be readily adjusted thereon by simply loosening the box on the nipple and sliding the box to the desired position.

The preferred form of the invention is herein shown and described but it will be readily understood that many alterations may be made without departing from the spirit of the invention.

What I claim as my invention is:—

1. An adustable support for electric fixtures and the like comprising a nipple of substantially uniform diameter throughout having at one end an extension of bendable material of substantially uniform thickness and width a portion of which extends transversely of the nipple thereby to engage a supporting bar, and threaded means on the nipple operable to clamp the bar against said transverse portion of the extension.

2. In combination, a supporting bar, an outlet box having a threaded aperture extending therethrough and a threaded nipple within said threaded aperture, said bar extending through said nipple, said box being adapted to be turned up against said bar to hold said nipple, bar and box in rigid relationship with one another.

3. In combination, a supporting bar, a nipple having an aperture for receiving said bar, said nipple having a threaded shank, and an outlet box having a threaded aperture for receiving said threaded shank, said box being adapted to exert a thrust against said bar to hold said nipple, box and bar in rigid relationship with one another.

4. In combination, a supporting bar, a nipple having an aperture for receiving said bar, and an outlet box, a wall of said outlet box being depressed to provide an extended portion normal to said wall, said extended portion and said threaded nipple having cooperating screw-threads whereby said box may be turned up upon said nipple to hold said nipple, bar and box in rigid relationship with one another.

5. In combination, a supporting bar, a nipple having an aperture for receiving said bar, and an outlet box, said outlet box having a central depressed portion, which depressed portion is internally screw-threaded, the shank of said nipple being externally screw-threaded to cooperate with the screw-threaded portion of said box, whereby said box may be turned up upon said nipple to hold said stud, bar and box in rigid relationship with one another.

HARRY SOMMERVILLE BANFIELD.